(12) United States Patent
Oh et al.

(10) Patent No.: US 8,944,500 B2
(45) Date of Patent: Feb. 3, 2015

(54) ARMREST FOR VEHICLE

(71) Applicant: Hyundai Motor Company, Seoul (KR)

(72) Inventors: Man Ju Oh, Gyeonggi-do (KR); Jae Woong Kim, Gyeonggi-do (KR); Jae Woo Park, Gyeonggi-do (KR); Tae Soo Sung, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 32 days.

(21) Appl. No.: 13/840,803

(22) Filed: Mar. 15, 2013

(65) Prior Publication Data

US 2014/0175846 A1 Jun. 26, 2014

(30) Foreign Application Priority Data

Dec. 21, 2012 (KR) .......................... 10-2012-0150324

(51) Int. Cl.
| | |
|---|---|
| A47C 7/72 | (2006.01) |
| B60R 7/08 | (2006.01) |
| B60N 3/10 | (2006.01) |
| B60N 2/46 | (2006.01) |

(52) U.S. Cl.
CPC . B60R 7/08 (2013.01); B60N 3/104 (2013.01); B60N 2/4613 (2013.01)

USPC .................................. 297/180.14; 297/188.14

(58) Field of Classification Search
CPC ......................................................... B60N 3/104
USPC ......................................... 297/180.14, 188.14
See application file for complete search history.

(56) References Cited

U.S. PATENT DOCUMENTS

| 7,631,931 B2 * | 12/2009 | Langensiepen ................ 297/115 |
| 2007/0204629 A1 * | 9/2007 | Lofy ................................ 62/3.61 |
| 2009/0288800 A1 * | 11/2009 | Kang et al. ...................... 165/42 |
| 2014/0069114 A1 * | 3/2014 | OH et al. ......................... 62/3.3 |

FOREIGN PATENT DOCUMENTS

KR 10-2012-0066212 6/2012

* cited by examiner

*Primary Examiner* — Kristina Junge
(74) *Attorney, Agent, or Firm* — Edwards Wildman Palmer LLP; Peter F. Corless

(57) ABSTRACT

The present invention relates to an armrest that includes a rotating shaft, an intake port, an exhaust port, an internal duct and a cup holder. The rotating shaft is disposed in the rear end of the armrest body and configured to pivotally connect the armrest body to a seat so that the armrest body may alternate between a retracted position in which the armrest functions as a seatback and an unfolded position in which the armrest functions as an armrest. The intake port, exhaust port, and internal duct are configured to provide heating and cooling of the cup holder.

17 Claims, 4 Drawing Sheets

ARMREST FOR VEHICLE

CROSS-REFERENCE TO RELATED APPLICATION

This application claims under 35 U.S.C. §119(a) the benefit of Korean Patent Application No. 10-2012-0150324, filed on Dec. 21, 2012 in the Korean Intellectual Property Office, the disclosure of which is incorporated herein in its entirety by reference.

BACKGROUND OF THE INVENTION

1. Field of the Invention

The present invention relates to an armrest for vehicles. More particularly, the present invention relates to an armrest that provides cooling and heating functions.

2. Description of the Related Art

Recently, vehicle cup holders having cooling and heating functions have been extensively researched and installed in vehicles. Such cup holders are typically provided with thermoelements that use electrical energy to provide two kinds of functions including cooling and heating functions. However, to date, there are no commercially viable techniques for effectively mounting cup holders in vehicles and efficiently providing cooling and heating systems for the cup holders.

A representative example of a conventional technique for an armrest with cooling and heating functions proposed a cooling and heating box for vehicles, which has enhanced cooling and heating efficiency. In detail, the cooling and heating box for vehicles according to this technique is provided with thermoelements. A first surface of each thermoelement is mounted to the perimeter of the bottom of the box. A duct is disposed adjacent to second surfaces of the thermoelements so that when the thermoelements are operated, heat generated from the second surfaces of the thermoelements is exhausted to the outside through the duct. Furthermore, the cooling and heating box further includes a control unit which controls the thermoelements such that when it is desired to use the box as a heating box, the thermoelements are connected in parallel to each other, and when it is desired to use the box as a cooling box, the thermoelements are connected in series to each other. Thereby, when the box is used both as a heating box and as a cooling box, the efficiency can be enhanced. Unfortunately, this conventional technique cannot be optimized for use as an armrest of a rear seat.

Furthermore, it should be noted that the description provided above is merely for aiding in understanding the background of the present invention, and should not be construed as admitted prior art

SUMMARY OF THE INVENTION

Accordingly, the present invention has been made in an effort to solve the above-described problems associated with the conventional art, and it is an object of the present invention to provide an armrest for a vehicle with a cup holder having cooling and heating functions, thus enhancing the marketability of the vehicle. The armrest of the present invention is configured such that a thermoelement and a heat exchange line are provided and are effectively arranged so as to provide both cooling and heating functions, while still allowing the armrest to function as a seat back when retracted into a rear seat.

In order to accomplish the above object, the present invention provides an armrest for a vehicle, including: a rotating shaft provided in a rear end of the armrest body so that when the armrest body is retracted into a seat, the armrest functions as a seatback, and when the armrest body is unfolded from the seat, the armrest functions as an armrest; an intake port formed in a front surface or an upper surface of a front end of the armrest body such that when the armrest body is retracted into the seat, the intake port is prevented from being exposed to an outside of the seat (e.g., the intake port may be covered by a portion of the seat into which the armrest is retracted); an exhaust port formed in the rear end of the armrest body; an internal duct installed in the armrest body, the internal duct connecting the intake port to the exhaust port; and a cup holder disposed on an air passage of the internal duct, with a thermoelement provided on the cup holder at a position adjacent to the internal duct.

The cup holder may comprise a plurality of cup holders disposed on opposite sides of the internal duct, and the thermoelements of the cup holders may be brought into contact with the internal duct in such a way that the thermoelements face each other. A heat exchange part may be disposed between the thermoelements, and may be configured for use by both thermoelements. The armrest may further include a blower in the internal duct configured to provide fluid communication between the intake port and the exhaust port by, for example, moving air from the intake port, through the internal duct and blower, and out the exhaust port. The cup holder may be disposed in the front end of the armrest body, and the blower may be disposed in the rear end of the armrest body.

A grill may be provided on the intake port to prevent a foreign substance from being drawn into the intake port.

The exhaust port may communicate with an area outside of a passenger compartment of the vehicle (e.g., a trunk compartment, the exterior environment, etc.). The internal duct may be disposed in a central portion of the armrest body and may extend in a longitudinal direction of the armrest body to connect the intake port to the exhaust port.

A cooling surface of each of the thermoelements may be brought into close contact with the corresponding cup holder, and a heat radiation surface of each of the thermoelements may be brought into close contact with the heat exchange part.

The heat exchange part may include a heat dissipation pin formed in such a way that air can flow along the internal duct, and opposite surfaces of the heat exchange part may be brought into close contact with the respective thermoelements.

The armrest body may be filled with a filler, wherein the filler may have a space through which the intake port is connected to the exhaust port, the space forming the internal duct.

The exhaust port may be formed in a rear surface of the rear end of the armrest body at a position spaced apart from a lower end of the armrest body by a predetermined distance.

The internal duct may include an intake duct extending from the intake port, and an exhaust duct extending from the exhaust port, wherein the intake duct and exhaust duct are connected to the blower, which allows fluid communication between the intake port and the exhaust port, via the intake and exhaust ductwork. In one embodiment, the exhaust duct may be connected to a front end of the exhaust duct (e.g., the end farthest from the exhaust port), and a rear end of the intake duct may be connected to an upper end of the blower so that fluid communication of air may be bent at a right angle relative to the blower. The blower may be connected to a lower end of the rear end of the intake duct so that the blower vertically intakes air and horizontally discharges the air through the exhaust duct The armrest may include a bellows-shaped external duct extending from the exhaust port to the outside of a passenger compartment of the vehicle.

An auxiliary blower may be provided on a side surface of the cup holder to circulate air in the cup holder. The auxiliary blower may be disposed adjacent to the thermoelement.

The armrest body may have an opening corresponding to an upper end of the cup holder, wherein a diameter of the opening may be less than an inner diameter of the cup holder.

As described above, in an armrest for vehicles according to the present invention, a cup holder which has cooling and heating functions is installed in the armrest, thus enhancing the marketability of high-end vehicles.

Particularly, a thermoelement and a heat exchange line, which are provided to realize the cooling and heating functions in the armrest, are effectively arranged so that the cooling and heating performances can be reliably ensured. Moreover, in the present invention, when the armrest is retracted into a seat to function as a seatback, it can provide comfort and ensure safety even when a vehicle accident occurs, thus further enhancing marketability.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Hereinafter, an armrest for vehicles according to a preferred embodiment of the present invention will be described in detail with reference to the attached drawings.

Figure 1:
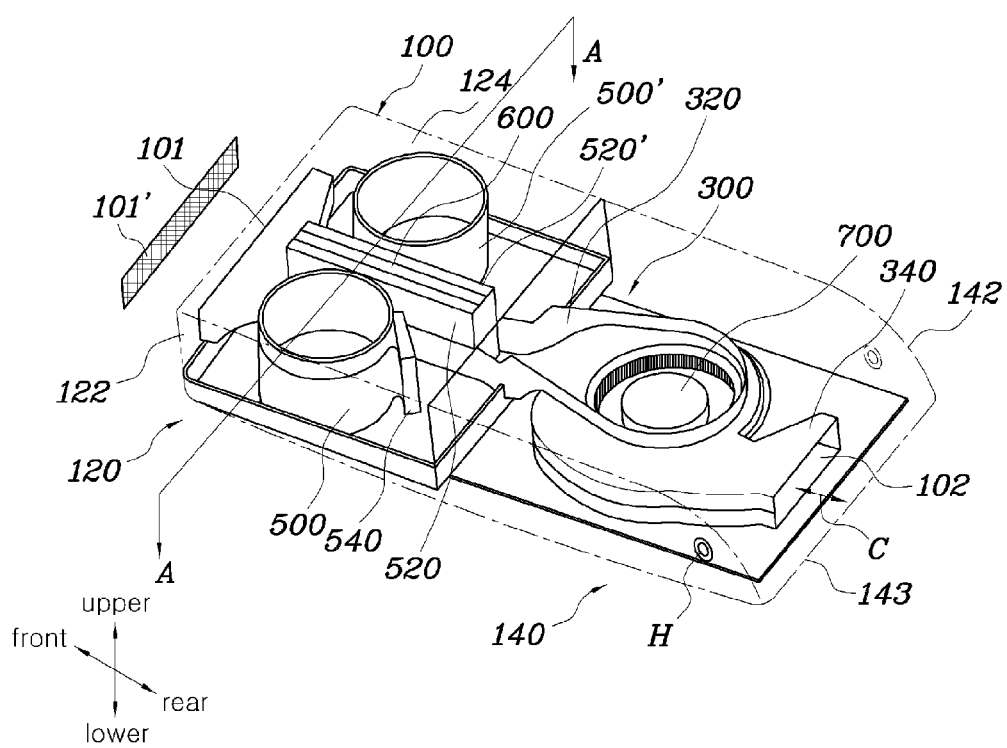
FIG. 1 is a perspective view of an armrest for vehicles, according to an exemplary embodiment of the present invention.
Figure 2:
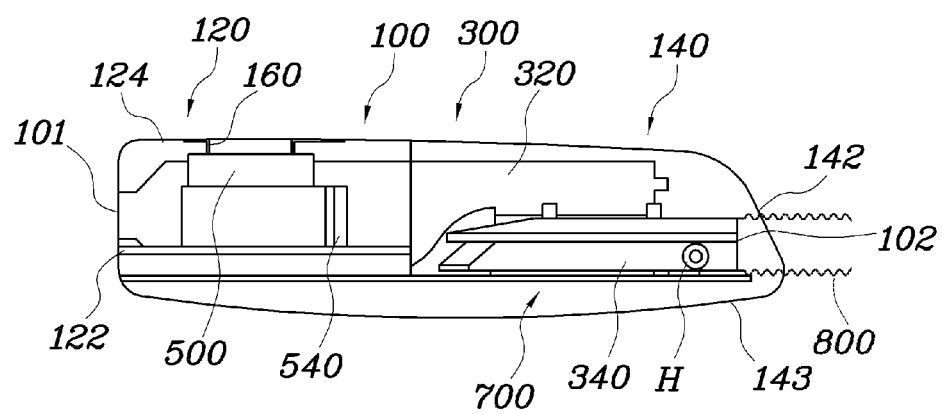
FIG. 2 is a side view of the armrest of FIG. 1.
Figure 3:
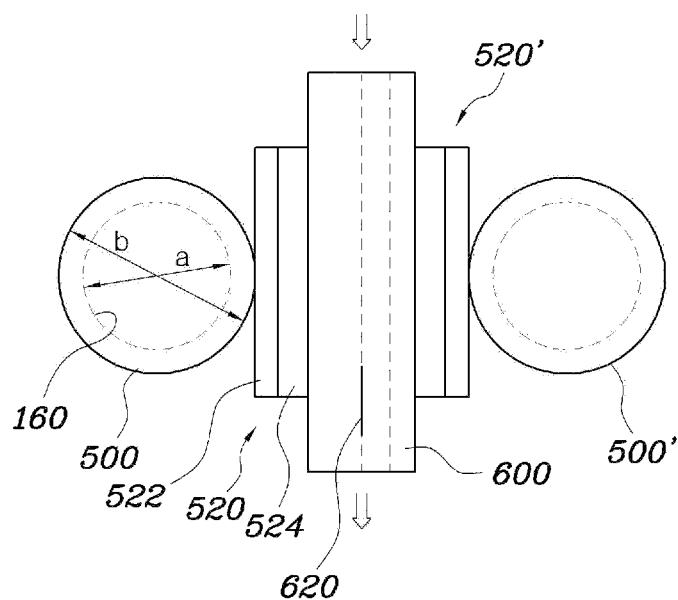
FIG. 3 is a view showing in detail a critical portion of the armrest of FIG. 1.

FIG. 1 is a perspective view of an armrest for vehicles, according to an exemplary embodiment of the present invention. FIG. 2 is a side view of the armrest of FIG. 1. FIG. 3 is a view showing in detail a critical portion of the armrest of FIG. 1.

The armrest according to an exemplary embodiment of the present invention includes a rotating shaft H, an intake port 101, an exhaust port 102, an internal duct 300 and a cup holder 500. The rotating shaft H may be provided in a rear end of the armrest body 100 so that when the armrest body 100 is folded and retracted into a seat, the armrest functions as a seatback and, when the armrest body 100 is unfolded from the seat, it functions as an armrest. In one exemplary embodiment, rotating shaft H may function as a pivot point to allow the front end of armrest body 100 to pivot up, and retract into, the seat housing armrest body 100. The intake port 101 may be formed in a front surface or an upper surface of a front end of the armrest body 100 such that when the armrest body 100 is retracted into the seat, the intake port 101 is prevented from being exposed to the outside. The exhaust port 102 may be formed in a rear end of the armrest body 100. The internal duct 300 is installed in the armrest body 100 and connects the intake port 101 to the exhaust port 102. The cup holder 500 may be disposed on an air passage of the internal duct 300 and is provided with a thermoelement 520 at a position adjacent to the internal duct 300.

The armrest of an exemplary embodiment of the present invention may function as a typical armrest or, alternatively, as a seatback. That is, the armrest body 100 has a rotating shaft H in the rear end thereof. Depending on the rotation of the armrest body 100 around the rotating shaft, when the armrest body 100 is folded and retracted into a seat, the armrest functions as a seatback and, when the armrest body 100 is unfolded from the seat, it functions as an armrest configured to provide heat or cool cup holders 500.

In the case when the armrest is provided in a three-seater rear seat, the armrest must be able to be retracted into the seat and function as a seat back for a middle occupant. Given this, the armrest must be designed such that the cooling and heating systems for cup holders 500 do not hinder the function of the armrest as the seatback, even though the cooling and heating systems may include elements that interface with areas outside of the passenger compartment of the vehicle (e.g., the interior space of the trunk, or the environment external to the vehicle).

The intake port 101 and the exhaust port 102 may be formed in the armrest and configured to provide cooling and heating functions of the cup holders 500. The intake port 101 is a passage configured to draw air from a passenger compartment into the armrest. Air containing waste heat that has been used for heat exchange may be discharged from the armrest through the exhaust port 102. In an exemplary embodiment of embodiment of the present invention, the intake port 101 may be formed in the front surface or upper surface of the front end of the armrest body 100 so that, when the armrest body 100 is retracted into the seat, the intake port 101 is not exposed to the outside (e.g., the passenger compartment proximate to the armrest). That is, if the intake port 101 is exposed to the outside when the armrest is retracted into the seat to function as a seatback rather than being extracted from the seat, it may make the occupant uncomfortable while the armrest is supporting him/her, and if the occupant collides with the armrest, the intake port 101 may become a safety hazard, causing direct contact between it and the occupant.

Therefore, in consideration of comfort and safety, the intake port 101 may be disposed at a location at which it can be prevented from being exposed to the outside (e.g., an exposed surface of the armrest) when the armrest is functioning as a seat back while it is allowed to be exposed to the outside when the armrest is extracted to function as an armrest. For this, the intake port 101 may disposed in the front surface 122 or the upper surface 124 of the front end 120 of the armrest body 100 rather than in a lower surface 143 of the front end 120, whereby when the armrest is retracted into the seat to function as a seat back, the intake port 101 can be prevented from being exposed to the outside by virtue of being shielded by the seat in which it is retracted.

Meanwhile, the exhaust port 102 is formed in a rear end 140 of the armrest body 100. In an exemplary embodiment, the exhaust port 102 may be formed in a rear surface 142 of the rear end 140 and configured to communicate to an area outside of the passenger compartment (e.g., a trunk compartment). A bellows-shaped external duct 800 may extend from the exhaust port 102 to the outside of the passenger compartment. Air containing waste heat that has been used for heat exchanger may be exhausted out of the passenger compartment so as to maintain climate control of the passenger compartment (e.g., by not adding heat to a passenger compartment that is being cooled in air-conditioning mode by a climate control system). Specifically, the bellows-shaped external duct 800 may be used to exhaust the air to space below the vehicle or into the trunk Thereby, when the armrest is retracted into, or extracted from, the seat, an air passage may be prevented from being blocked.

The exhaust port 102 may be formed in the rear surface of the rear end of the armrest body 100 at a position spaced apart from a lower end of the armrest body 100 by a predetermined distance, so that even when the armrest is retracted into the seat, the external duct 800 is prevented from being blocked or folded and permanently damaged.

Figure 4:
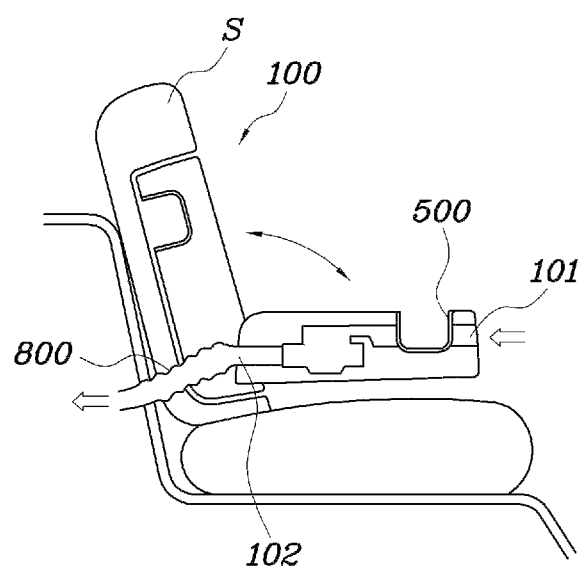
FIG. 4 is a view showing the operation of the armrest of FIG. 1.

FIG. 4 is a view showing the operation of the armrest of FIG. 1. As shown in FIG. 4, when the armrest is extracted from the seat, it functions as an armrest and a cup holder. When the armrest is retracted into the seat, it functions as a seatback of a center rear seat. Waste heat that has been used for heat exchange is exhausted into the trunk of the vehicle or the like by the external duct 800.

Meanwhile, in the case of the exemplary embodiment of the armrest having the above-mentioned construction, it may be necessary to increase the efficiency of an internal air-conditioning system for cooling or heating the cup holder. However, noise or vibrations resulting from the operation should be reduced as much as possible. For example, to reliably cool or heat the cup holders of the armrest, a duct, a blower, and a thermoelement may be required. However, if the duct or the blower is disposed in such a way that flow resistance is significantly increased, noise and vibrations may result. In particular, because the armrest is a place on which a user rests his/her arm, the user may be irritated or annoyed, even by a small noise or vibration from within the armrest. Therefore, an internal system layout must be designed such that the flow resistance can be reduced as much as possible.

For this, in an exemplary embodiment of the present invention, the internal duct 300 is installed in the armrest body 100 to connect the intake port 101 to the exhaust port 102. The cup holder 500 is disposed on the air passage of the internal duct 300. The thermoelement 520 of the cup holder 500 is disposed adjacent to the internal duct 300.

Particularly, the cup holder 500 may comprise a pair of cup holders 500 and 500' which are respectively provided on opposite sides of the internal duct 300. The cup holders 500 and 500' may be disposed such that the thermoelements 520 and 520' of the cup holders 500 and 500' face each other and come into contact with the internal duct 300. The thermoelements 520 and 520' may be configured to face each other, and share the internal duct 300. In other words, the cup holders 500 and 500' share the single internal duct 300 so that the layout of the duct can be simplified and the air passage can be as linear as possible without being bent, whereby the flow resistance can be minimized.

The present invention further includes a heat exchange part 600 which may be disposed between the thermoelements 520 and 520' and used for both the thermoelements 520 and 520', thus enhancing the thermal efficiency of the thermoelements 520 and 520'. In an exemplary embodiment of the present invention, a Peltier module is used for each thermoelement 520, 520'. Briefly, the Peltier module includes a cooling surface 522 and a heat radiation surface 524 and functions as a heat pump which transfers heat from one side to the other side when electricity is applied thereto. The thermoelements 520 and 520' of the cup holders 500 and 500' share the heat exchange part 600 so that the layout can be simplified. Particularly, if either cup holder 500 or 500' is used for cooling and the other cup holder 500 or 500' is used for heating, the thermal efficiency can be markedly increased by characteristics of the Peltier module as a heat pump.

Meanwhile, a blower 700 is provided in the internal duct 300 to facilitate fluid communication of air between the intake port 101 and the exhaust port 102. In an exemplary embodiment, when the blower 700 is operated, air may be drawn from the passenger compartment into the armrest through the intake port 101. The air may then flow rearward along the internal duct 300. Simultaneously, the thermoelements 520 and 520' perform heat exchange and discard waste heat. Air drawn into the internal duct 300 may receive heat from the heat radiation surfaces 524 of the thermoelements 520 and 520' that are brought into contact with the heat exchange part 600 so that the thermoelements 520 and 520' can discard waste heat. Thereafter, air containing waste heat that has been used for the heat exchange is sent to the exhaust port 102, via internal duct 300, by the blower 700.

Therefore, the blower 700 increases the efficiency of the thermoelements 520 and 520'. For example, because the heat exchange part 600 is used for both the thermoelements 520 and 520', the layout of the internal duct 300 is simplified. The internal duct 300 may be disposed between the cup holders 500 and 500' and used for both. Thus, the air flow line may be almost linearly formed from the intake port 101 to the exhaust port 102 so that, despite a comparatively small volume of air of the blower 700, a satisfactory heat exchange efficiency can be ensured. Advantageously, the smaller the air volume of the blower 700 is, the more noise and vibration are reduced.

Furthermore, the cup holders 500 and 500' may disposed in the front end of the armrest body 100, and the blower 700 may be installed in the rear end of the armrest body 100. Thus, the user can easily put a cup into either of the cup holders 500 and comfortably support his/her elbow on the armrest. A grill 101' is provided on the intake port 101 to prevent foreign substances from being drawn into the intake port 101.

In an exemplary embodiment of the present invention, the internal duct 300 may be disposed in a central portion of the armrest body 100 and extend in the longitudinal direction of the armrest body 100 to connect the intake port 101 to the exhaust port 102. Thus, the a linear flow of air may be established through the system, whereby the flow resistance of the air is markedly reduced.

The cooling surfaces of the thermoelements 520 and 520' come into close contact with the corresponding cup holders 500, and the heat radiation surfaces thereof come into close contact with the heat exchange part 600 so that the heat exchange can be effectively performed. The heat exchange part 600 includes a heat dissipation pin 620 which is formed in such a way that air can flow along the internal duct 300. The opposite surfaces of the heat exchange part 600 may be brought into close contact with the respective thermoelements 520 and 520'. Particularly, the heat dissipation pin 620 may be oriented parallel to the direction in which air flows through the system. In this case, although the time for which heat exchange is performed is reduced, the flow resistance can be markedly reduced so that noise and vibration can be reduced.

Furthermore, the armrest body 100 may be filled with a filler. The filler has a space through which the intake port 101 may be connected to the exhaust port 102, thus forming an internal duct 300. This structure may avoid problems that may result from installation of a separate duct in the armrest body 100, for example, an increase in weight, a sense of difference in operation of the armrest, the possibility of the duct striking a person in the vehicle when an accident occurs, generation of noise when the vehicle travels on a rough road, etc.

In another exemplary embodiment of the present invention, the internal duct 300 may include an intake duct 320 which extends from the intake port 101, and an exhaust duct 340 which extends from the exhaust port 102. The blower 700 may be provided on a front end of the exhaust duct 340, and a rear end of the intake duct 320 may be connected to an upper end of the blower 700 so that the air passage may be bent at a right angle based on the blower 700, thus facilitating the intake and exhaust flow of the blower 700, and avoiding a problem of flow resistance being increased by mixture of intake air and exhaust air. That is, this structure can prevent a problem of flow resistance being increased in the blower 700 by mixture of the intake air and the exhaust air, which may be induced when an intake air pressure and an exhaust air pressure are abnormal because the pressure of the passenger compartment is different from that of the exterior of the vehicle. Advantageously, this structure allows the blower 700 that is connected to the lower end of the rear end of the intake duct 320 to intake air vertically, and discharge the air horizontally, through the exhaust duct 340.

An auxiliary blower 540 may be provided on a side surface of each cup holder 500, 500' to circulate air in the cup holder 500, 500'. The auxiliary blower 540 may be disposed adjacent to the corresponding thermoelement 520, 520'. The armrest body 100 has openings 160 which are formed at positions corresponding to upper ends of the respective cup holders 500 and 500'. Each opening 160 may be configured such that a diameter "a" thereof is less than an inner diameter "b" of the corresponding cup holder 500, 500'. Therefore, the cooling or heating performance of each cup holder 500, 500' may be further enhanced not only by conduction but also by convection current in the cup holder 500, 500'. Since the opening 160 may be formed to be comparatively small, a loss of air in the cup holder 500, 500' can be reduced, whereby convection heat transfer between the cup holder 500, 500' and a cup received therein can be maintained for a long time.

As described above, in an armrest for vehicles according to an exemplary embodiment of the present invention, a cup holder which has cooling and heating functions may be incorporated into in the armrest, thus enhancing the marketability of high-class vehicles. Particularly, a thermoelement and a heat exchange line which are provided to realize the cooling and heating functions are effectively arranged so that the cooling and heating performances can be reliably ensured. Moreover, in the present invention, when the armrest is retracted into a seat to function as a seatback, it can provide comfort and ensure safety even when a vehicle accident occurs, thus further enhancing marketability.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An armrest for a vehicle, comprising:
    an armrest body having a front end, a rear end, and two sides;
    a rotating shaft disposed in the rear end of the armrest body, the rotating shaft configured to pivotally connect the armrest body to a seat so that the armrest body may alternate between a retracted position in which the armrest functions as a seatback and an unfolded position in which the armrest functions as an armrest;
    an intake port formed in a front surface or an upper surface of the front end of the armrest body, the intake port being hidden when the armrest body is in the retracted position;
    an exhaust port formed in the rear end of the armrest body;
    an internal duct installed in the armrest body, the internal duct configured to provide fluid communication between the intake port to the exhaust port; and
    one or more cup holders disposed in the armrest body, the cup holders in contact with an air passage of the internal duct and a thermoelement, the thermoelement positioned adjacent to the internal duct;
        wherein the one or more cup holders are disposed on opposite sides of the internal duct, and the thermoelements of each cup holder are configured to contact the internal duct so as to face each other.

2. The armrest as set forth in claim 1, wherein a heat exchange part is disposed between, and integrally connected to, both thermoelements.

3. The armrest as set forth in claim 2, wherein a cooling surface of each of the thermoelements is brought into close contact with the corresponding cup holder, and a heat radiation surface of each of the thermoelements is brought into close contact with the heat exchange part.

4. The armrest as set forth in claim 2, wherein the heat exchange part comprises a heat dissipation pin configured so that air can flow along the internal duct, and opposite surfaces of the heat exchange part are brought into close contact with the respective thermoelements.

5. The armrest as set forth in claim 1, further comprising a blower positioned in the internal duct and configured to send air from the intake port to the exhaust port.

6. The armrest as set forth in claim 5, wherein the cup holder is disposed in the front end of the armrest body, and the blower is disposed in the rear end of the armrest body.

7. The armrest as set forth in claim 5, wherein the internal duct further comprises an intake duct extending rearward from the intake port and an exhaust duct extending forward from the exhaust port, wherein the blower is disposes on a front end of the exhaust duct, and a rear end of the intake duct is connected to an upper end of the blower so that air from the intake duct enters the blower at a right angle.

8. The armrest as set forth in claim 7, wherein the blower is connected to a lower end of the rear end of the intake duct so that the blower vertically intakes air and horizontally discharges the air through the exhaust duct.

9. The armrest as set forth in claim 1, wherein the intake port further comprises a grill.

10. The armrest as set forth in claim 1, wherein the exhaust port is in fluid communication with an area outside of a passenger compartment of the vehicle.

11. The armrest as set forth in claim 1, wherein the internal duct is longitudinally disposed in a central portion of the armrest body and configured to provide fluid communication between the intake port and the exhaust port.

12. The armrest as set forth in claim 1, wherein the armrest body is filled with a filler, the filler configured to provide a space which fluidly connects the intake port to the exhaust port, the space forming the internal duct.

13. The armrest as set forth in claim 1, wherein the exhaust port is formed in a rear surface of the rear end of the armrest body at a position spaced apart from a lower end of the armrest body by a predetermined distance.

14. The armrest as set forth in claim 1, further comprising a bellows-shaped external duct extending from the exhaust port to an area outside of a passenger compartment of the vehicle.

15. The armrest as set forth in claim 1, wherein an auxiliary blower is provided on a side surface of the cup holder to circulate air in the cup holder.

16. The armrest as set forth in claim 15, wherein the auxiliary blower is disposed adjacent to the thermoelement.

17. The armrest as set forth in claim 1, wherein the armrest body has an opening corresponding to an upper end of the cup holder, wherein a diameter of the opening is less than an inner diameter of the cup holder.

* * * * *